United States Patent [19]

Smith, Jr.

[11] Patent Number: 4,889,329
[45] Date of Patent: Dec. 26, 1989

[54] SELF-ALIGNING POST CUTTING JIG

[76] Inventor: Joel C. Smith, Jr., 3816 Denman Dr., Apex, N.C. 27502

[21] Appl. No.: 238,908

[22] Filed: Aug. 31, 1988

[51] Int. Cl.⁴ .............................................. B25B 3/00
[52] U.S. Cl. ....................................... 269/2; 269/287; 403/263
[58] Field of Search ....................... 269/1, 2, 287, 288; 403/258, 263, 381, 383, 401; 83/574, 745; 30/166 A, 371, 372

[56] References Cited

U.S. PATENT DOCUMENTS

| | | |
|---|---|---|
| 1,521,908 | 1/1925 | Schuster . |
| 2,608,220 | 8/1952 | Cauthen ................................ 143/34 |
| 2,777,487 | 1/1957 | Potts ..................................... 145/129 |
| 3,209,459 | 10/1965 | Fish, Jr. .................................. 33/174 |
| 3,525,515 | 8/1970 | Melfi ...................................... 269/287 |
| 4,306,479 | 12/1981 | Eberhardt ............................. 83/745 |
| 4,358,214 | 11/1982 | Shull ...................................... 483/263 |
| 4,653,195 | 3/1987 | Esparza ................................. 33/529 |

Primary Examiner—Judy Hartman
Attorney, Agent, or Firm—Richard E. Jenkins

[57] ABSTRACT

A self-aligning post cutting jig comprising four elongate cutting guide members each having fasteners at opposing ends thereof for securing the guide members together in a closed four-sided jig for placement on a post. The fastener is adapted to provide a first securement mode wherein the ends of the guide members are spaced-apart to facilitate placement onto a post and a second securement mode wherein the ends of the guide member are brought into contact with the post so as to provided square and true cutting guide thereon.

10 Claims, 3 Drawing Sheets

SELF-ALIGNING POST CUTTING JIG

DESCRIPTION

1. Technical Field

The present invention relates to cutting jigs, and more particularly to a new self-aligning post cutting jig which can be used to quickly and accurately cut straight cuts and miter cuts and the like in fence posts and landscape timbers.

2. Background Art

The objective of accurately cutting fence posts and timber posts with a circular saw, saber saw or router has long been a problem due to the fact known to those familiar with the carpentry art that the posts are not always perfectly square or, in other words, that the sides do not always form precise 90 degree corners. Thus, when attempting to make straight cuts, miter cuts, and points on posts as well as detailing with a router, the results are many times disappointing since the angle of the cut will not be perfectly straight if the posts or timbers are not themselves perfectly square or true. More specifically, the carpenter will attempt to make the cuts by first placing a speed square on the posts or timbers to draw a pencil cutting line which will then be used as a guide for the saw. The difficulty with conventional penciled cutting lines drawn in this way is that they do not tend to be straight due to the natural twists and curves in many posts and timbers which are not square or true. Thus, the cut made along the penciled cutting line in many instances tends to result in an uneven cut and an unsatisfactory appearance of the cut and/or detailed fence posts or landscape timbers.

Thus, the need exists for a simple and inexpensive self-aligning cutting jig which may be placed on a fence post or landscape timber and result in a true cut regardless of whether the post or timber possesses a perfectly square cross section and true 90 degree corners. Applicant believes that his novel jig meets this long-felt need for such a device.

DISCLOSURE OF THE INVENTION

In accordance with the present invention, applicant provides a self-aligning post cutting jig designed specifically to provide a guide for straight and true cuts and detailing on fence posts and landscape timbers with a circular saw or the like without regard to whether the posts or timbers possess a true square cross section.

The self-aligning jig comprises four elongate cutting guide members which have fastening means at opposing ends thereof for securing the guide members together in a closed four-sided square or true configuration. The fastening means provide a first securement mode wherein the ends of the guide members are slightly spaced-apart from each other to facilitate slidably placement onto a post or timber to be cut and a second securement mode wherein the ends of the guide members are brought into rigid contact to fixedly engage the post and to provide a straight and true cutting line thereon for a circular saw or the like.

Accordingly, it is a principle object of the present invention to provide a new self-aligning post cutting jig for use in precisely cutting fence posts and landscape timbers with a circular saw cutting tool.

It is a further object of the present invention to provide a self-aligning post cutting jig which provides a straight and true cutting line on a fence post or landscape timber without regard to whether the post or timber has a square cross section and corners which form true right angles.

It is another object of the present invention to provide a self-aligning post cutting jig which when tightened onto a fence post or landscape timber tends to tighten on the high spots thereof in order to provide for true straight cuts, miter cuts, and router detailing whether or not the post or timber has a true square cross section.

BRIEF DESCRIPTION OF THE DRAWINGS

Some of the objects of the invention having been stated, other objects will become evident as the description proceeds, when taken in connection with the accompanying drawings, in which.

BEST MODE FOR CARRYING OUT THE INVENTION

Figure 1:
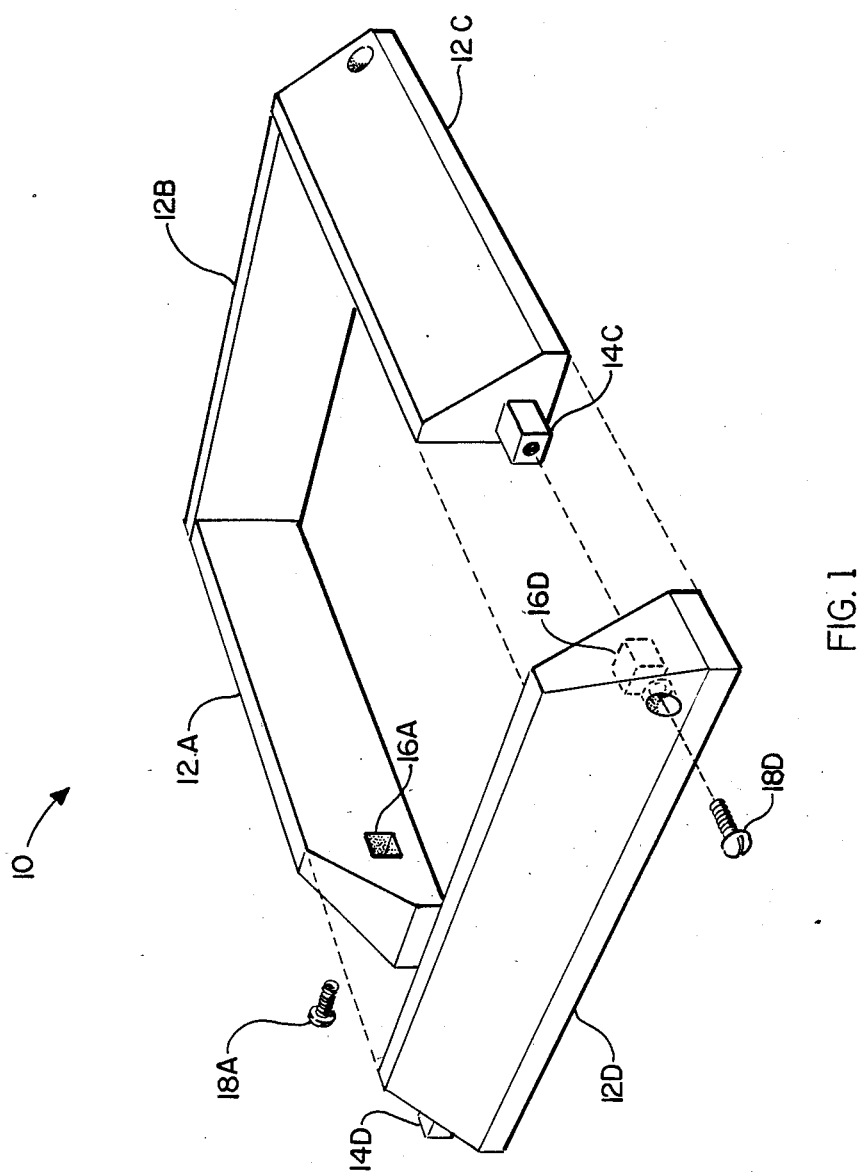
FIG. 1 is a perspective view of the self-aligning post cutting jig of the present invention.

Referring now to the drawings, FIG. 1 illustrates a first embodiment of the self-aligning jig of the invention, generally designated 10, for guiding a hand held circular saw, saber saw, router and the like in providing straight cuts, miter cuts, and points on fence posts and landscape timbers regardless of whether the posts and timbers possess true square corners. It will be appreciated that self-aligning post cutting jig 10 can be used with these and other reciprocating or circular motion cutting tools of the type which are adapted to seat on the post or timber workpiece and be guided thereacross by the jig. Moreover, although the preferred embodiment of jig 10 is rigid plastic, jig 10 may be formed of sheet metal or any other material of sufficient strength to be fashioned into a jig of the type described hereinbelow.

Figure 3:
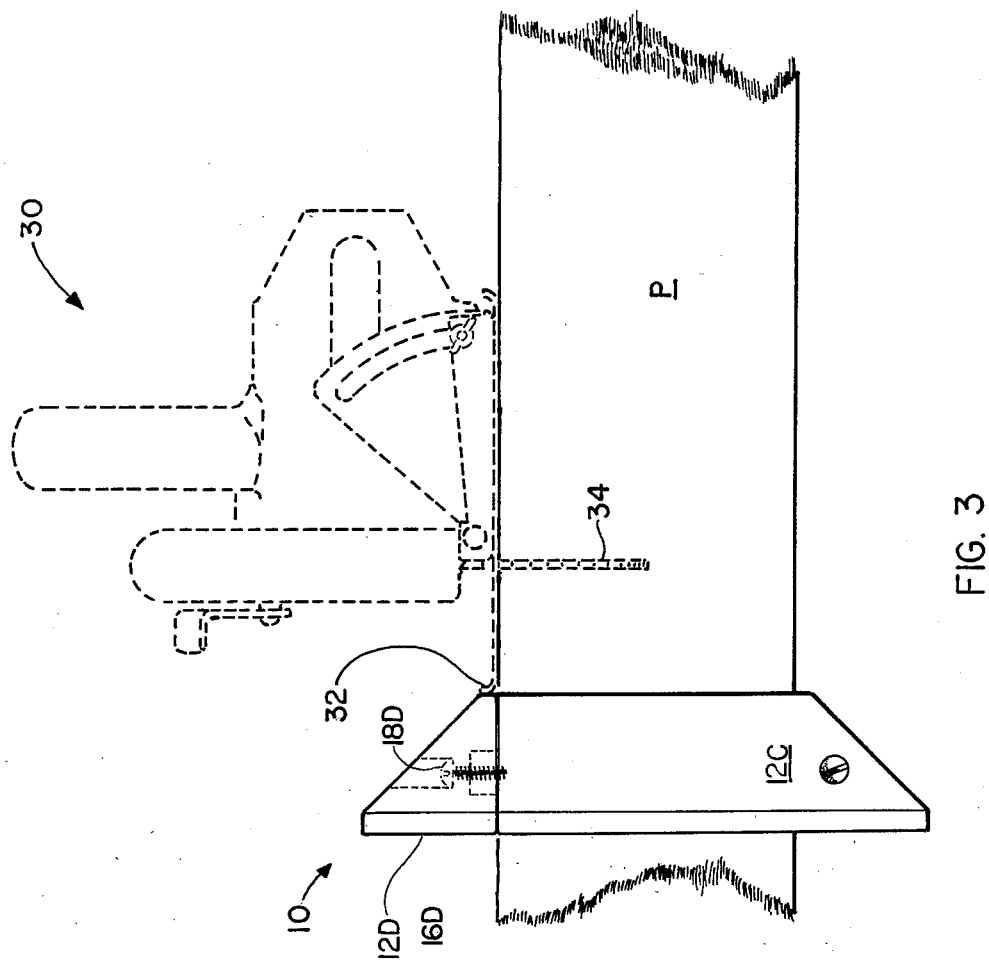
FIG. 3 is a side elevation view of the first embodiment of the self-aligning post cutting jig of the present invention being used as a guide for a circular saw to create a true cut for a squared-off post.

Jig 10 shown in FIG. 1 of the drawings is constructed of four cutting guide members 12A–12D which interlock in a non-overlapping manner so as to form a rigid and true jig. The outside surfaces of cutting guide members 12A–12D incline inwardly so as to allow for the rotation of a saw being directed along guide members 12A–12D in order to cut a four-sided point at the top of a post and other special cuts (see FIGS. 1 and 3). Cutting guide members 12A–12D each have a corresponding square peg 14A–14D, respectively, extending from the end face adjacent one end thereof and a corresponding square aperture 16A–16D, respectively, defined adjacent the other end thereof in the inside post-engagement surface of the guide member. Square apertures 16A–16D are of a size so as to slidably and snugly receive square pegs 14A–14D when placed or urged therein (e.g., peg 14A into aperture 16B, peg 14B into aperture 16C, peg 14C into aperture 16D, and peg 14D into aperture 16A). Each of cutting guide members 12A–12D also includes a screw 18A–18D, respectively, which is rotatably seated within a corresponding aperture 16A-16D, and each of square pegs 14A-14D is axially threaded so as to be threadably engaged by one of screws 18A-18D (e.g., screw 18A into peg 14D, screw 18B into peg 14A, screw 18C into peg 14B, and screw 18D into peg 14C). Thus, post cutting jig 10 is fitted together in an interlocking fashion with the peg of each guide member being positioned within the aperture of a first adjacent guide member and the aperture of the guide member receiving the peg of a second adjacent guide member so as to form a closed four-sided configuration with a true square cross section and defining a single plane wherein the opposing sides are parallel and the adjacent sides are perpendicular. Moreover, the inside post-engagement surfaces of guide members 12A-12D can be seen with reference to FIG. 1 to extend parallel to each other in the vertical direction (or the direction of the longitudinal axis of a post upon which jig 10 is positioned) and to perpendicularly intersect the plane defined by jig 10.

By way of further explanation as to the use of jig 10, for example, to make a straight cut on the end of a fence post, first a conventional square would be used to place a pencil line around the end of the fence post near the desired cut line. Next, screws 18A-18D of post jig 10 would be loosened so as to allow guide members 12A-12D to become slightly spaced-apart at the opposing ends thereof from adjacent guide members. This slightly increases the distance between opposing guide members and allows jig 10 to be slidably slipped onto the post and aligned with the previously drawn pencil line. Screws 18A-18D are then tightened so as to secure jig 10 to the post. Next, and with reference to FIG. 3, a circular saw 30 (shown in phantom lines) such as a skill saw is positioned with the fence 32 thereof abutting the top edge of jig 10. Fence post P is then cut using jig 10 as a guide in order to provide a straight and true cut by blade 34. If desired, saw 30 can be used to cut at such an angle as to create a point on fence post P in order to give fence post P a true design that appears to have been cut in a mill. Also, jig 10 can be used with landscape timbers in a similar fashion. Jig 10 can be fabricated in any desired size from 4 by 4 inches to 20 by 20 inches so as to fit substantially any fence post or landscape timber from 4 by 4 inches to 20 by 20 inches.

Figure 2:
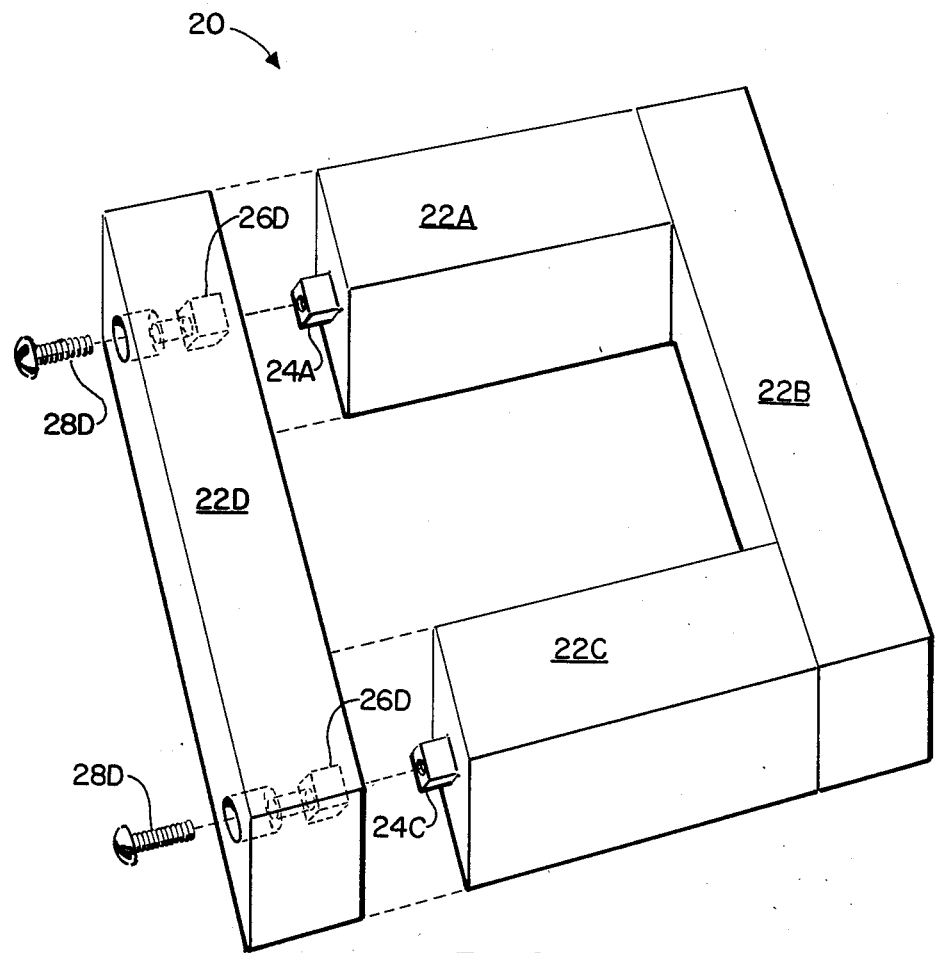
FIG. 2 is a perspective view of a second embodiment of the self-aligning post cutting jig of the present invention.
Figure 2A:
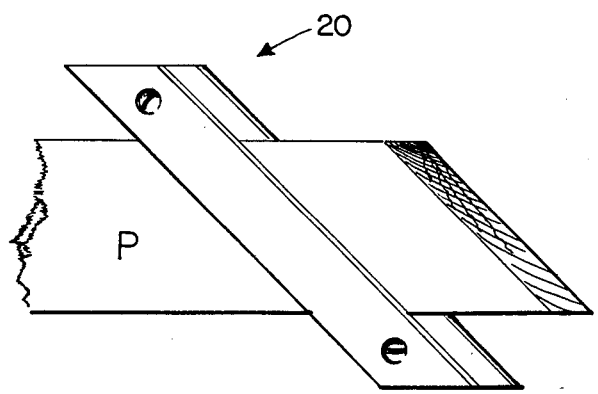
FIG. 2A is a side elevation view of the second embodiment of the present invention secured to a fence post.

A second embodiment of the self-aligning jig of the invention is shown in FIG. 2 and generally designated 20. Jig 20 is a self-squaring jig primarily intended for use in making miter cuts to fence posts and landscape timbers. FIG. 2A illustrates jig 20 secured to a fence post P in a fashion to enable a true 45 degree miter cut with a circular saw such as a skill saw in the same fashion as described hereinabove for the first embodiment of the invention.

Jig 20 comprises four cutting guide members 22A-22D which interlock to form a closed four-sided square configuration defining a single plane wherein the longitudinal axes of the opposing sides are parallel and the longitudinal axes of the adjacent sides are perpendicular. Guide members 22A and 22C each have a square peg 24A and 24C, respectively, extending from the end face at each opposing end thereof, and guide members 22B, 22D each define square apertures 26B, 26D, respectively, on the inside post engagement surface adjacent each opposing end thereof. The four square apertures 26B, 26D each have rotatably seated therein a respective one of four screws 28B, 28D. Each of the four square pegs 24A, 24C defines a threaded bore therein for threadably receiving one of the four screws 28B, 28D. Thus, first peg 24A fits into aperture 26D and receives screw 28D, second peg 24A fits into aperture 26B and receives screw 28B, first peg 24C fits into aperture 26D and receives screw 28D, and second peg 24C fits into aperture 26B and receives screw 28B.

As with jig 10, jig 20 may be initially loosened for placement on fence post P by loosening screws 28B, 28D. When jig 20 is properly positioned on post P, screws 28B, 28D are tightened so as to fixedly secure jig 20 to fence post P (see FIG. 2) for use in making a true miter cut in the post regardless of whether the corners thereof are square and true. Depending on the angle of the miter cut desired to be guided by jig 20, the post-engagement inside surfaces of guide members 22A-22D which extend parallel to each other in the vertical direction (the longitudinal axis of the post) will intersect the plane defined by the jig at an angle greater than 0 degrees and less than 90 degrees. For example, the intersection angle would be 45 degrees in order for jig 20 to provide a guide to create a 45 degree miter cut in fence post P as shown in FIG. 2A.

Thus, a new self-aligning jig for fence posts and landscape timbers has been described which provides for a true cut on posts and timbers which may not have square corners or true angles. This is accomplished with the self-aligning jig of the invention with its true squared configuration which tightens onto the high spots of a non-true-cut post and serves as a guide to create a true cut therethrough. The jig serves as a guide for a true cut on square or true post by engaging all sides thereof when tightened.

It will be understood that various details of the invention may be changed without departing from the scope of the invention. Furthermore, the foregoing description is for the purpose of illustration only, and not for the purpose of limitation—the invention being defined by the claims.

What is claimed is:

1. A self-aligning cutting jig for four-sided posts comprising four elongate cutting guide members each having a plurality of flat side walls including an inner wall for placement in abutting relationship to a corresponding post side and an outer wall, said guide members each having adjustable fastening means at opposing ends thereof for securing said four guide members together in a closed four-sided configuration having four adjustable corners wherein no guide member overlaps beyond the outer wall of an adjacent guide member, said guide members defining a single plane wherein the longitudinal axes of the opposing sides are parallel and the longitudinal axes of the adjacent sides are perpendicular, said fastening means being positioned within a cross-sectional profile of said guide members and adapted at each of said four corners to provide a first securement mode wherein the ends of said guide members are spaced-apart each from the other to facilitate slidable placement onto a post to be cut and a second securement mode wherein the ends of said guide members are brought into said non-overlapping contact to facilitate fixed engagement of the post and to provide a straight cutting guide thereon, whereby a tool directed along an outer perimeter of the jig encounters no obstacles.

2. A self-aligning post cutting jig according to claim 1 wherein the inside post-engagement walls of said guide members extend parallel to each other in the vertical direction and perpendicularly intersect the plane defined by said jig.

3. A self-aligning post cutting jig according to claim 1 wherein the inside post-engagement walls of said guide members extend parallel to each other in the vertical direction and intersect the plane defined by said jig at an angle greater than 0° and less than 90°.

4. A self-aligning post cutting jig according to claim 1 wherein said fastening means comprises a peg at one end of each guide member having a threaded bore, an aperture for receiving a peg being defined at the other end thereof, and a screw rotatably positioned within said aperture for threadably engaging said peg so as to urge it into and secure it within said aperture, whereby said guide members are arranged so that the peg at one end of each guide member is received by the aperture of a first adjacent guide member and the aperture at the other end of the guide member receives and secures the peg of a second adjacent guide member.

5. A self-aligning post cutting jig according to claim 4 wherein said pegs and apertures comprise a square cross-sectional shape, and said pegs are positioned on the end face at one end of said guide members and said apertures are positioned on the inside post-engagement wall adjacent the other end of said guide members so as to form an interlocking and rigid jig structure when said pegs are fully secured within said corresponding apertures by said screws.

6. A self-aligning post cutting jig according to claim 1 wherein said fastening means comprises two guide members having a peg at each end having a threaded bore and two guide members defining an aperture for receiving a peg at each end thereof, and a screw rotatably positioned within each of said apertures for threadably engaging a corresponding peg so as to urge it into and secure it within said aperture, whereby said guide members are arranged so that the pegs at each end of the said two pegged guide members are received by the apertures at each end of the said two apertured guide members to form the four-sided jig.

7. A self-aligning post cutting jig according to claim 6 wherein said pegs and apertures comprise a square cross-sectional shape, and said pegs are positioned on the end faces of said two pegged guide members and said apertures are positioned on the inside post-engagement wall adjacent each end of said two apertured guide members so as to form an interlocking and rigid jig structure when said pegs are fully secured within said corresponding apertures by said screws.

8. A self-aligning post cutting jig according to claim 1 wherein said jig is formed of plastic.

9. A self-aligning post cutting jig according to claim 2 wherein each of said guide members has an inclined outer wall so as to allow for the rotation of a saw being directed along said guide member.

10. A self-aligning post cutting jig according to claim 4 wherein each of said guide members has an inclined outer wall so as to allow for the rotation of a saw being directed along said guide member.

* * * * *